May 17, 1960
G. E. COLBY
2,937,029
TOOL CHUCK WITH FLUID TRANSFER
Filed March 11, 1957
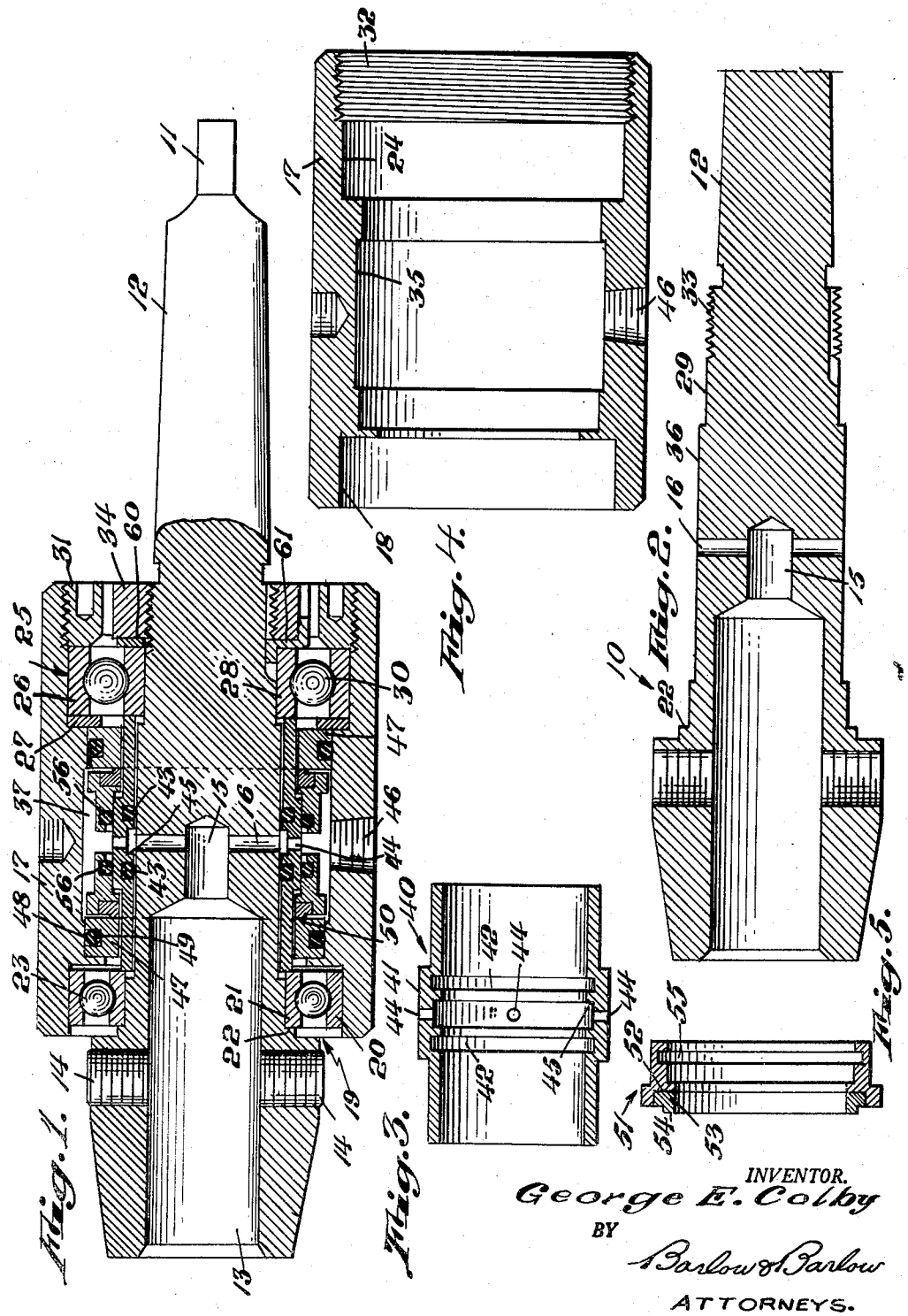
INVENTOR.
George E. Colby
BY
Barlow & Barlow
ATTORNEYS.

United States Patent Office 2,937,029
Patented May 17, 1960

2,937,029

TOOL CHUCK WITH FLUID TRANSFER

George E. Colby, Barrington, R.I., assignor to Magnetic Seal Corp., a corporation of Rhode Island Application March 11, 1957, Serial No. 645,342

3 Claims. (Cl. 279—20)

This invention relates to a chuck for a drill or other tool in which there is incorporated a means for transferring fluid to the tool so as to cool and lubricate the same.

One of the objects of this invention is to provide a means for transferring fluid to the tool without materially detracting from the required tortional strength of the chuck for rotation of the tool.

Another object of the invention is to provide an arrangement wherein one part rotates relative to the other and there is a balanced bearing relation between the two to prevent off-axis misalignment which might increase friction or create out of alignment of the rotation of the tool.

Another object of the invention is to provide an arrangement so that an effective seal may be provided between the rotating parts and thus prevent leaking of liquid from around the area of injection of the liquid into the chuck.

Another object of this invention is to provide for mounting of the operating parts upon a chuck body in a unit that they may be positioned at one time on the body of the chuck.

Another object of this invention is to provide for a driving and sealing relation between the sealing parts and yet permit of some axial movement such as may be attained with the use of soft compressible rings, sometimes referred to as O-rings.

With these and other objects in view, the invention consists of certain novel features of construction as will be more fully described and particularly pointed out in the appended claims.

In the accompanying drawings:

Fig. 1 is a central sectional view through the chuck in assembled relation;

Fig. 2 is a sectional view of the body of the chuck;

Fig. 3 is a sectional view of the sleeve which is located about the body of the chuck to provide shoulders and an arrangement by which the parts may be assembled from one end of the shank;

Fig. 4 is a sectional view of the shell which is held relatively stationary with reference to the body of the chuck and in which the body is rotatably mounted; and Fig. 5 is a sectionaal view showing a collar with an inserted carbon sealing face and is a part of one of the seals.

In proceeding with this invention, I provide a body of a chuck which consists essentially of a solid part having an axial bore and transverse passage and suitably shouldered to take the various parts of the liquid transfer mechanism. A shell in which this body is rotatably mounted by means of antifriction bearings embraces the body covering the transverse passage. This shell is so arranged that a chamber is provided between the shell and the body about the transverse passage and through this stationary shell into this chamber liquid may enter. Within the chamber, seals are provided at either side of the transverse passage which are mounted upon a sleeve held in the axial space between the bearings and which enables the seals, bearings, and shell to be assembled as a unit for positioning upon the body.

In order that effective seals may be provided, I have utilized magnets formed of "Alnico" material, and I run a collar having a suitable wearing face against these "Alnico" magnets to provide the seal. Such faces may be bearing bronze, ceramic, carbon or others.

With reference to the drawings, 10 designates generally the body of this chuck which is provided at one end with a flattened portion 11 which may serve to be mounted in some machine for rotating the same. The shank 12 extending therefrom is tapered and is provided with a series of shoulders along its extent for purposes which will presently appear in the mounting of the various parts upon the body. In the opposite end of the body there is an axial bore 13 for the reception of the drill or other tool which is to be driven. The tool may be secured in position by screws 14 having an internal rotating means to be operated with a key or such like instrument. This bore is reduced as at 15 and communicates with a passage 16 extending laterally across the bore.

A shell 17 as shown by itself in Fig. 4 is of a size to telescope over the body and be spaced a substantial distance therefrom. In one end of this shell there is a recess 18 in which the ball bearing 19 is mounted, having its outer race 20 received in the recess 18 and its inner race 21 engaging the shoulder 22 of the body 10. The balls 23 are between these two races. At the other end of the shell there is a recess 24 for receiving the ball bearing 25 which has its outer race 26 received in the recess 24 and abutting a washer 27 at one end of this recess 24, while its inner race 28 engages the portion 29 of the body in a manner to rotate therewith. The balls 30 are between these races 26 and 28 providing anti-friction rotation. An annulus 31 threadedly engages the threads 32 of the shell and may be screwed inwardly by spanner wrench sockets to hold the ball race 26 fixed in the shell. A nut 34 engages threads 33 on the body to hold the inner race secured to the body 10.

The portion of the shell about the passageway 16 is of such a diameter 35 as to space it substantially from the diameter 36 of the body on either side of the passage 16, and there is thus provided a chamber 37 between this shell and the body.

In order that the parts about to be described may be assembled as a unit with the shell and its bearings, I provide a sleeve designated generally 40 and shown by itself in Fig. 3 which extends between the two inner races of the bearings 19 and 25 and is of a size to closely receive the portion 36 of the body. This sleeve is of tubular formation being enlarged at its mid portion 41 and this enlargement is provided with recesses 42, 42 in which O-rings of a resilient and usually synthetic rubber material 43 are mounted so as to provide a driving connection with the body and a seal with the body. Between these two recesses and O-rings and in this enlarged portion 41 of the seal, there is an opening 44 substantially aligning with the passage 16 and which openings 44 may exist at four different locations about the sleeve. At the location of these openings, there is also a recess 45 which provides an annular space about the body at the location of the passage 16 and openings 44 and with which space both communicate. Fluid may enter the shell through an opening 46 which may be screw threaded for a suitable fitting to connect a fluid conduit thereto for the movement of fluid into the sleeve and into the chamber 37. The fluid may pass from this chamber through one or more of the openings 44 into the circular space provided by the recesses 45 and thence through the passage 16 to the bore 15 and 13.

In order to provide a seal for this chamber 37, I have mounted upon the sleeve 40 a sealing means on either side of the openings 44 and passage 16. Each of these sealing means are the same and comprises a magnet 47 of "Alnico" material which is a composition having the following percentages by weight: aluminum 6–12%; nickel 14–25%; cobalt 12½–35%; copper 0–6%; and balance iron, and which is recessed as at 48 and provided in the recess with an O-ring of soft elastic material 49 so as to seal the magnet to the shell 17; but as this magnet has an internal diameter slightly larger than the sleeve 40 upon which it is mounted and an external diameter slightly smaller than the shell 17 within which it is mounted, it may rock so that its sealing face 50 in a single plane may adjust itself with relation to the annular seal with which it engages for better functioning.

The other part of this seal comprises a collar which is designated generally 51 (see Fig. 5 as well as Fig. 1) which has a recess 52 therein receiving a carbon ring 53 having a lapped annular sealing face 54 in a single plane to engage the "Alnico" material 47, while the main portion of this collar is a material which will be attracted by the magnet so as to pull the sealing faces together. A recess 55 is provided in the portion of this collar which extends along the enlarged portion 41 of the shell and is provided with an O-ring 56 to seal this collar to the sleeve 40 and yet permit of sufficient axial movement for the sealing faces to move toward each other. This O-ring connection 56 also provides a driving relation between the collar and the sleeve so that it will rotate with the body but relative to the shell. There is also a sufficient play between the collar and the shell so that a slight rocking may occur by reason of this O-ring connection that the sealing faces may align one with the other for better functioning of their parts.

By reason of the shell and the seals mounted on the sleeve within the shell and between the ball bearings which are held in the shell, this shell and its functioning parts may be slipped over the body shown in Fig. 2 as a unit assembly; and the nut 34 may be screwed onto the threads 33 of the body to hold it in place. The inner race of the ball bearings 19 abuts a shoulder 22. The shell spaces the two ball bearings by reason of its engagement with the inner race 28 of the ball bearing 25 while the nut 34 may engage the washer 60 engaging this inner race and serving to force the same home. A key 61 serves to lock the inner race to the body for rotation of these parts together, the whole rotating relative to the shell in the spaced anti-frictionally mounted bearing.

I claim:

1. A chuck for a tool comprising a rotatable body having an axially extending tool receiving socket, and a lateral passage communicating with said socket, a shell embracing said body and extending axially on either side of said passage, bearings on either side of said passage relatively rotatably mounting said body in said shell the relative external diameter of said body and the internal diameter of said shell at the location of said passage being such as to provide a chamber between said body and shell, means to admit fluid through said shell into said chamber, and separate and independent sealing means located on either side of said passage for sealing fluid from escaping from said chamber, each comprising a magnet with a rotary sealing face and an axially movable collar with a rotary sealing face, one fixed to said shell and the other fixed to said body and mutually drawn toward each other and means to rockably mount one for adjustment of its face with reference to the other.

2. A chuck as in claim 1, wherein said magnet and collar are both rockably mounted for adjustment of their sealing faces and one of them is also axially movable.

3. A chuck as in claim 1 wherein a sleeve is located between said bearings and has conduits communicating with said passage and is fixed to said body and has said magnet and collar mounted thereon whereby the parts may be assembled as a unit on said body.

References Cited in the file of this patent

UNITED STATES PATENTS

| | | |
|---|---|---|
| 2,270,927 | Browne | Jan. 27, 1942 |
| 2,384,281 | Carter | Sept. 4, 1945 |
| 2,533,179 | Redinger | Dec. 5, 1950 |
| 2,565,791 | Wagner et al. | Aug. 28, 1951 |
| 2,589,766 | Bernstein | Mar. 18, 1952 |
| 2,772,897 | Shaw | Dec. 4, 1956 |
| 2,777,702 | Rodal | Jan. 15, 1957 |

FOREIGN PATENTS

| | | |
|---|---|---|
| 678,981 | Great Britain | Sept. 10, 1952 |